United States Patent [19]

Isogawa et al.

[11] Patent Number: 4,630,116
[45] Date of Patent: Dec. 16, 1986

[54] VIDEO SIGNAL INVERTING CIRCUIT

[75] Inventors: Toshiaki Isogawa, Atsugi; Ryuji Shiono, Machida; Tsutomu Niimura, Hiratsuka; Joichi Sato; Mitsuru Sato, both of Atsugi, all of Japan

[73] Assignee: Sony Corporation, Tokyo, Japan

[21] Appl. No.: 579,107

[22] Filed: Feb. 10, 1984

[30] Foreign Application Priority Data

Feb. 16, 1983 [JP] Japan .................................. 58-23995

[51] Int. Cl.$^4$ .............................................. H04N 5/14
[52] U.S. Cl. ...................................... 358/160; 358/171
[58] Field of Search ............... 358/160, 166, 171, 172, 358/114, 124; 307/262, 264

[56] References Cited

U.S. PATENT DOCUMENTS

| 2,825,757 | 3/1958 | Dennison et al. | 358/172 |
| 3,644,668 | 2/1972 | Reeber | 358/160 |
| 4,022,972 | 5/1977 | Pires | 358/124 |
| 4,257,065 | 3/1981 | Papay | 358/172 |

Primary Examiner—Tommy P. Chin
Assistant Examiner—David E. Harvey
Attorney, Agent, or Firm—Hill, Van Santen, Steadman & Simpson

[57] ABSTRACT

A video signal inverting circuit, wherein a pedestal level of an output signal is selectively changed between a posi-mode and a nega-mode. The pedestal level of the output video signal is set equal to the pedestal level of the posi-mode output video signal in the nega-mode in accordance with a nega-mode/posi-mode control signal. In spite of the nega-mode/posi-mode control signal, a level setting circuit for the posi-mode is used during horizontal blanking period in the nega-mode.

3 Claims, 11 Drawing Figures

FIG. 2A    FIG. 2B    FIG. 2C
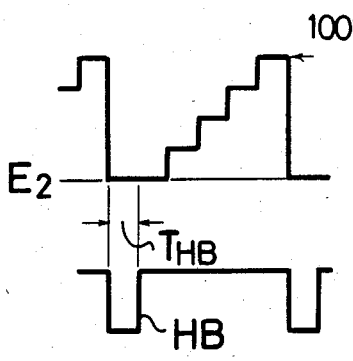
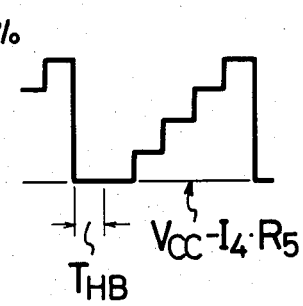
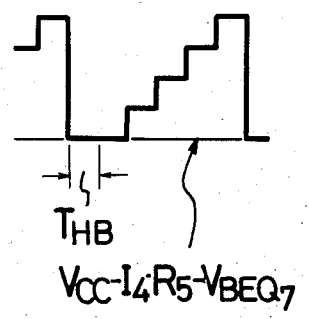
FIG. 3A    FIG. 3B
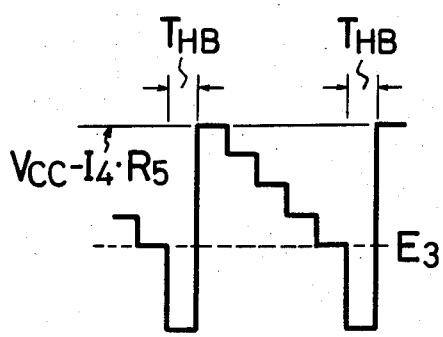
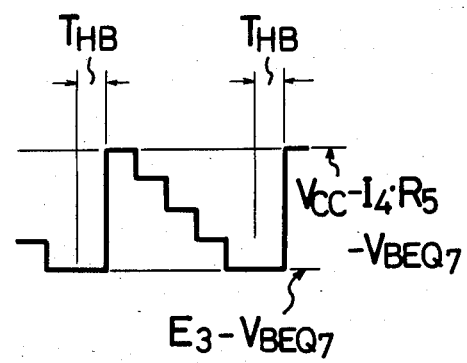

VIDEO SIGNAL INVERTING CIRCUIT

BACKGROUND OF THE INVENTION

1. Field of the Invention

The present invention relates generally to a video signal inverting circuit and is directed more particularly to a circuit for inverting the polarity of a video signal in which a signal provided by taking a negative film by a television camera has to be inverted in polarity so as to invert the black and white levels thereof to provide a normal video signal.

2. Description of the Prior Art

If image informations on nega-films are recorded in a VTR (video tape recorder), there is an advantage that without printing the negative film on a printing paper such image can be viewed at any time by using a television receiver.

Therefore, it is proposed to pick up the negative film by the television camera and to record the video signal thereof in the VTR. In this case, since the video signal which is provided by picking up the negative film is in such a state that the black and white levels of the video signal are inverted relative to the real object, such video signal must be recorded on the VTR under the state that the polarity thereof is inverted by a video signal inverting or nega-posi inverting circuit so to have the normal polarity.

FIG. 1 shows an example of a conventional video signal inverting or nega-posi inverting circuit.

In FIG. 1, a reference numeral 1 designates an input terminal to which a video signal $S_V$ picked up by, for example, a television camera is supplied. Such video signal $S_V$ is supplied to the base of a transistor Q2 which constitute a differential amplifier 2 together with a transistor Q1 and also to the base of a transistor Q3 which constitute a differential amplifier 3 together with a transistor Q4. These differential amplifiers 2 and 3 are alternately changed over by switching transistors Q5 and Q6 connected differentially relative to a current source 4 depending on the mode whether the input signal $S_V$ is positive, wherein the black and white levels thereof keep a normal polarity relation therebetween and the output signal is derived with the same polarity as that of the input signal (hereinafter, referred to as posi-mode) and the mode when the input video signal $S_V$ is positive, wherein the polarity relation between the black and white levels of the video signal is inverted and the output is derived with the inverted polarity to the input (hereinafter, referred to as nega-mode).

The collectors of the transistors Q2 and Q4 are connected together and the connection point thereof is connected through a resistor 5 to a power source terminal 9. Accordingly, when the differential amplifier 2 is in operation, at the connection point of the collectors of the transistors Q2 and Q4 appears a video signal which is provided by inverting the incoming video signal $S_V$ in polarity, while when the differential amplifier 3 in operation at the above connection point appears a video signal which has the same polarity as that of the incoming video signal $S_V$. The video signal thus appeared at the connection point of the collectors of the transistors Q2 and Q4 is then supplied to a differential amplifier 7 which is formed of transistors Q7 and Q8 connected differentially to a current source 6. This video signal is obtained with the same polarity at an output terminal 8 led out from a common connection point of the emitters of the transistors Q7 and Q8.

A reference numeral 10 designates an input terminal to which a nega-mode/posi-mode switching signal $S_{NP}$ is applied. The nega-mode/posi-mode switching signal $S_{NP}$ is high level in the posi-mode and is low level in the nega-mode.

A reference numeral 11 designates an input terminal to which a horizontal blanking pulse HB is applied. The horizontal blanking pulse HB becomes low in level during a horizontal blanking period $T_{HB}$. The horizontal blanking pulse HB is supplied to a base of a transistor Q9 which is connected differentially to a transistor 10. On the other hand, the switching signal $S_{NP}$ from the input terminal 10 is supplied to a base of the other transistor Q10 and to a base of a transistor Q11. A collector of the transistor Q11 is connected to a base of the transistor Q5.

Consequently, in the posi-mode, the switching signal $S_{NP}$ becomes high level, therefore the transistors Q10 and Q11 are turned on and hence the collectors thereof become low level in potential. As a result, the transistor Q5 is turned off and the transistor Q6 is turned on so that the differential amplifier 3 becomes operative. Thus, at the output terminal 8 appears an output video signal of the same polarity as that of the incoming video signal $S_V$.

At this time, let it be considered the case when a video signal having pedestal level E2 as shown in FIG. 2A is supplied to the input terminal 1. If the comparing reference voltage of the differential amplifiers 2 and 3 is taken as E2, the current value of the current source 4 is taken as $2I_4$ and the resistance value of the resistor 5 is taken as $R_5$, the output video signal of the differential amplifier 3 obtained at the collector of the transistor Q4 is a video signal of the same polarity as that of the incoming video signal $S_V$ and the pedestal level of which is expressed as $V_{CC} - I_4 \cdot R_5$ ($V_{CC}$ is the power source voltage) as shown in FIG. 2B. Accordingly, at the output terminal 8 is obtained the output video signal of the same polarity as that of the incoming video signal $S_V$ and the pedestal level of which is given by $(V_{CC} - I_4 \cdot R_5 - V_{BEQ7})$ as shown in FIG. 2C.

Although the horizontal blanking pulse HB of the incoming video signal $S_V$ is supplied through the input terminal 11 to the base of the transistor Q9, the transistor Q9 is in the off-state in the posi-mode so that the switching relation is not affected at all. Moreover, in posi-mode, a comparing reference voltage E3 is set in such a manner that the base potential of the transistor Q8 always becomes lower than the base potential of the transistor Q7 in the differential amplifier 7.

In the nega-mode in which the switching signal $S_{NP}$ becomes at low level, the transistor Q11 is turned off, so that the transistor Q5 turns on and hence the transistor Q6 turns off. Thus, the differential amplifier 2 is operated to apply to the base of the transistor Q7 a video signal which is provided by inverting the incoming video signal $S_V$ in polarity. In nega-mode, the transistor Q9 is turned on so that in response to the horizontal blanking pulse HB supplied to the base thereof, a transistor Q12 connected between a common connection point of the collectors of the differential amplifiers 2 and 3 and the ground is turned off when the pulse HB is at high level, while the transistor Q12 is turned on when the pulse HB is at low level. Therefore, the differential amplifier 2 supplies such output signal on which the pulse of the same polarity as that of the pulse HB is superimposed on the incoming video signal.

More particularly, if the incoming video signal $S_V$ is the signal as shown in FIG. 2A, the video signal supplied to the base of the transistor Q7 of the differential amplifier 7 becomes such a signal as shown in FIG. 3A, wherein the incoming video signal is inverted in polarity with the potential ($V_{CC} - I_4 \cdot R_5$) as the center, and further the pulse of the same polarity as that of the pulse HB is superimposed thereon during the period $T_{HB}$ and it becomes lower than the reference voltage E3. As is clear from FIG. 3A, in this case, the reference voltage E3 is selected to be the same potential as that of the portion of the original signal corresponding to the 100% white level when the signal is inverted in polarity as described above.

Then, at the output terminal 8 is obtained an output video signal having a pedestal level of $E3 - V_{BEQ7}$ and the 100% white level of ($V_{CC} - I_4 \cdot R_5 - V_{BEQ7}$) as shown in FIG. 3B when the above output video signal is regarded as the video signal of the normal polarity.

As described above, the polarity of the video signal is inverted in the nega-mode. As is clear from the above description, in the conventional video signal inverting circuit, the pedestal level of the output video signal is changed in posi-mode and nega-mode. Therefore, in order that the pedestal levels of the video signal in nega-mode and posi-mode may coincide with each other before the video signal is supplied to a video processing circuit which is provided at the output side of the video signal inverting circuit, the conventional video signal inverting circuit requires an additional clamp circuit to make the pedestal levels equal to a predetermined level. Besides, this additional clamp circuit causes a problem of the follow-up property of the clamp operation when the polarity of the input signal is changed in the nega-mode and the posi-mode.

OBJECTS AND SUMMARY OF THE INVENTION

It is an object of the present invention to provide an improved video signal inverting circuit which can remove the above defects inherent in the conventional video signal inverting circuit.

It is another object of the present invention to provide a video signal inverting circuit in which a pedestal level of an output video signal is fixed regardless of the selection of nega-mode and posi-mode.

It is a further object of the present invention to provide a video signal inverting circuit which does not require a clamp circuit unlike the prior art.

It is a still further object of the present invention to provide a video signal inverting circuit which is free from a problem of follow-up property caused by the selection of nega-mode and posi-mode.

It is a yet further object of the present invention to provide a video signal inverting circuit which is suitable for being adapted to a video tape recorder.

According to one aspect of the present invention, there is provided a video signal inverting circuit comprising: a video input terminal to which an incoming video signal is supplied; a phase splitter connected to said video input terminal; an input circuit connected to said phase splitter for selecting either a non-inverted incoming video signal or an inverted incoming video signal supplied through said input circuit based on a polarity control signal; and first and second dc level setting circuits connected to said switching circuit for selectively setting the dc level of an output video signal obtained through said switching circuit based on said polarity control signal.

The other objects, features and advantages of the present invention will become apparent from the following description taken in conjunction with the accompanying drawings through which the like references designate the same elements and parts.

BRIEF DESCRIPTION OF THE DRAWINGS

FIGS. 2A to 2C, FIGS. 3A and 3B are respectively diagrams useful for the explanation thereof;

DESCRIPTION OF THE PREFERRED EMBODIMENT

An embodiment of a video signal inverting circuit according to the present invention will hereinafter be described with reference to FIGS. 4 to 6.

Figure 4:
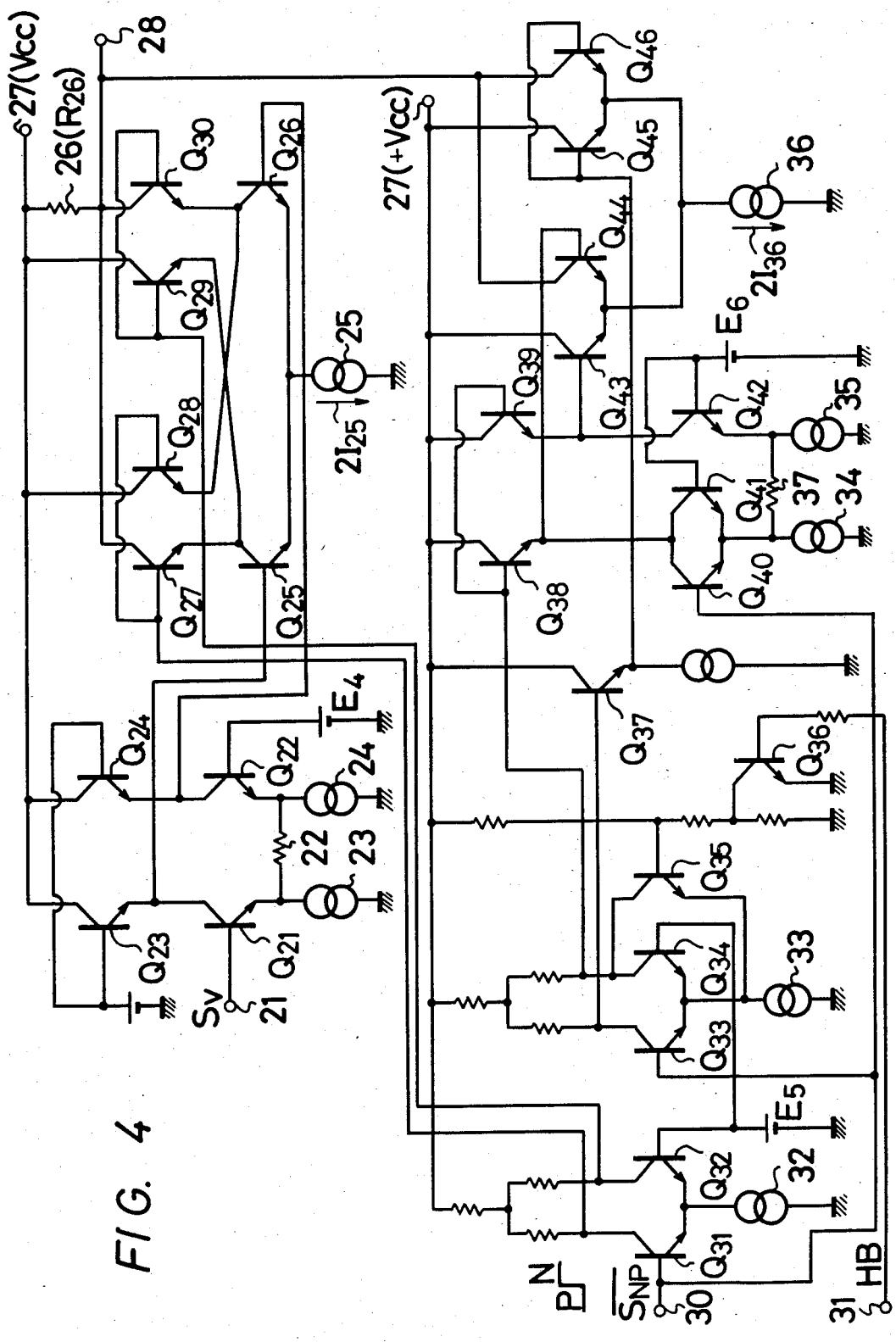
FIG. 4 is a circuit diagram showing an embodiment of a video signal inverting circuit according to the present invention.

FIG. 4 is a circuit diagram showing an embodiment of a video signal inverting circuit according to the present invention. In FIG. 4, a reference numeral 21 designates an input terminal to which an incoming video signal $S_V$ is applied. The incoming video signal $S_V$ is then supplied to a base of a transistor Q21 which constitutes a differential amplifier together with a transistor Q22. Emitters of these transistors Q21 and Q22 are connected together through a resistor 22 and also respectively grounded through current sources 23 and 24. A reference voltage E4 which is equal to the pedestal level of the input video signal $S_V$ is supplied to a base of the other transistor Q22. The transistors Q21 and Q22 are connected at their collector sides with current-to-voltage converting transistors Q23 and Q24, bases of which are supplied with the same reference voltage.

The video signals obtained at the collectors of the transistors Q21 and Q22 are respectively supplied to bases of transistors Q25 and Q26 which are connected differentially to a current source 25. The transistors Q25 and Q26 are connected at their collector sides with two pairs of transistors Q27, Q28 and Q29, Q30, each pair of the transistors being connected differentially. Then, the collector of the ansistor Q27 which becomes the same polarity relative to the polarity of the incoming video signal $S_V$ applied to the input terminal 21 is connected to the collector of the transistor Q30 which becomes the polarity opposite thereto. Between this connection point and a power source terminal 27 is connected a load resistor 26, while from this connection point is led out an output terminal 28.

Each pair of the transistors Q27, Q28 and Q29, Q30 are selected in response to the posi-mode and the nega-mode. A reference numeral 30 designates an input terminal to which a nega-mode/posi-mode switching signal is applied. In this embodiment, the switching signal supplied to the input terminal 30 has the polarity opposite to that in FIG. 1, namely, the inverted signal $\overline{S_{NP}}$ which becomes at low level in the posi-mode, while it becomes at high level in the nega-mode.

The switching signal $\overline{S_{NP}}$ is supplied to a base of a transistor Q31 which constitutes a differential amplifier together with a transistor Q32, and these transistors are connected differentially to a current source 32. A collector of the transistor Q31 is connected to the bases of the pair of the transistors Q27 and Q28, while a collector of the transistor Q32 is connected to the bases of the pair of the transistors Q29 and Q30, respectively. Thus, each pair of the transistors Q27, Q28 and Q29, Q30 are selected in response to the nega-mode and the posi-mode. Namely, in the posi-mode, since the switching signal $\overline{S_{NP}}$ is at low level, the base potential of the transistor Q31 is lower than a reference voltage E5 which is the base potential of the other transistor Q32 so that the transistor Q31 is turned off, while the transistor Q32 is turned on. Consequently, the base potentials of the pair of the transistors Q27 and Q28 become high level and hence the transistors Q27 and Q28 are turned on. Therefore, the incoming video signal $S_V$ with the polarity is delivered to the output terminal 28.

At this time, the potential relation of the output video signal is made as follows.

The switching signal $\overline{S_{NP}}$ from the input terminal 30 is also supplied to a base of a transistor Q33 which constitutes a differential amplifier together with a transistor Q34, and these transistors are connected differentially to a current source 33. Since a reference voltage E5 is applied to the base of the other transistor Q34, in the posi-mode, the transistor Q33 is turned off, while the transistor Q34 is turned on. Thus, the collector potential of the transistor Q33 becomes high level so that an emitter-follower transistor Q37 connected to the collector of the transistor Q33 is turned on. The emitter output of the transistor Q37 is supplied to bases of a pair of transistors Q45 and Q46 to turn them on. The pair of transistors Q45 and Q46 are connected differentially to another pair of transistors Q43 and Q44 with respect to a current source 36. In addition, the collectors of transistors Q44 and Q46 are connected together and the connection point thereof is connected to the connection point between the resistor 26 and the output terminal 28.

The switching signal $\overline{S_{NP}}$ from the terminal 30 is supplied to the base of a transistor Q40 which is connected differentially to transistors Q41 and Q42 the bases of which are commonly supplied with a predetermined voltage E6. To be more concrete, the emitters and collectors of the transistors Q40 and Q41 are connected together, respectively and the connection point of the emitters thereof is grounded through a current source 34. The emitter of the transistor Q42 is grounded through a current source 35 and a resistor 37 is interposed between the emitter of the transistor Q42 and the connection point of the emitters of the transistors Q40 and Q41. At the collector connection point of the transistors Q40 and Q41 and the collector of the transistor Q42 are respectively provided a pair of current-to-voltage converting transistors Q38 and Q39. To the bases of the transistors Q38 and Q39 is applied the collector potential of the transistor Q34. Then, the potential at the collector connection point of the transistors Q40 and Q41 and the potential at the collector of the transistor Q42 are respectively applied to the bases of the transistors Q43 and Q44 which are connected differentially.

In the posi-mode, as mentioned before, since the transistor Q34 is made on, its collector potential is low level and thereby the transistors Q38 and Q39 are turned off. Thus, the differential pair of transistors Q43 and Q44 are turned off, too.

Figure 5A:
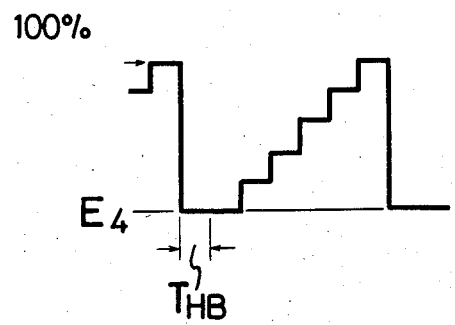
FIGS. 5A, 5B and FIGS. 6A, 6B are respectively diagrams useful for the explanation thereof.
Figure 5B:
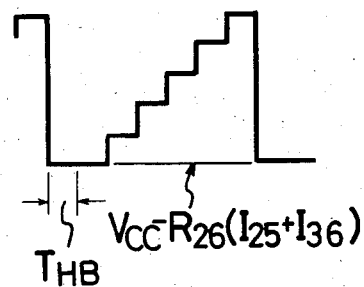

Based on the fact described above, in the posi-mode, the pair of transistors Q27 and Q28 and the pair of transistors Q45 and Q46 are selected and turned on. Accordingly, when an incoming video signal $S_V$ as shown in FIG. 5A is applied to the input terminal 21, at the output terminal 28 is developed an output video signal shown in FIG. 5B which has the same polarity as the incoming video signal $S_V$ and the pedestal level is expressed as $$V_{CC} - R_{26}(I_{25} + I_{36}) \quad (a)$$

where the current values of the current sources 25, 36 are taken as $2I_{25}$, $2I_{26}$, and the resistance value of the resistor 26 is taken as $R_{26}$, respectively.

Figure 1:
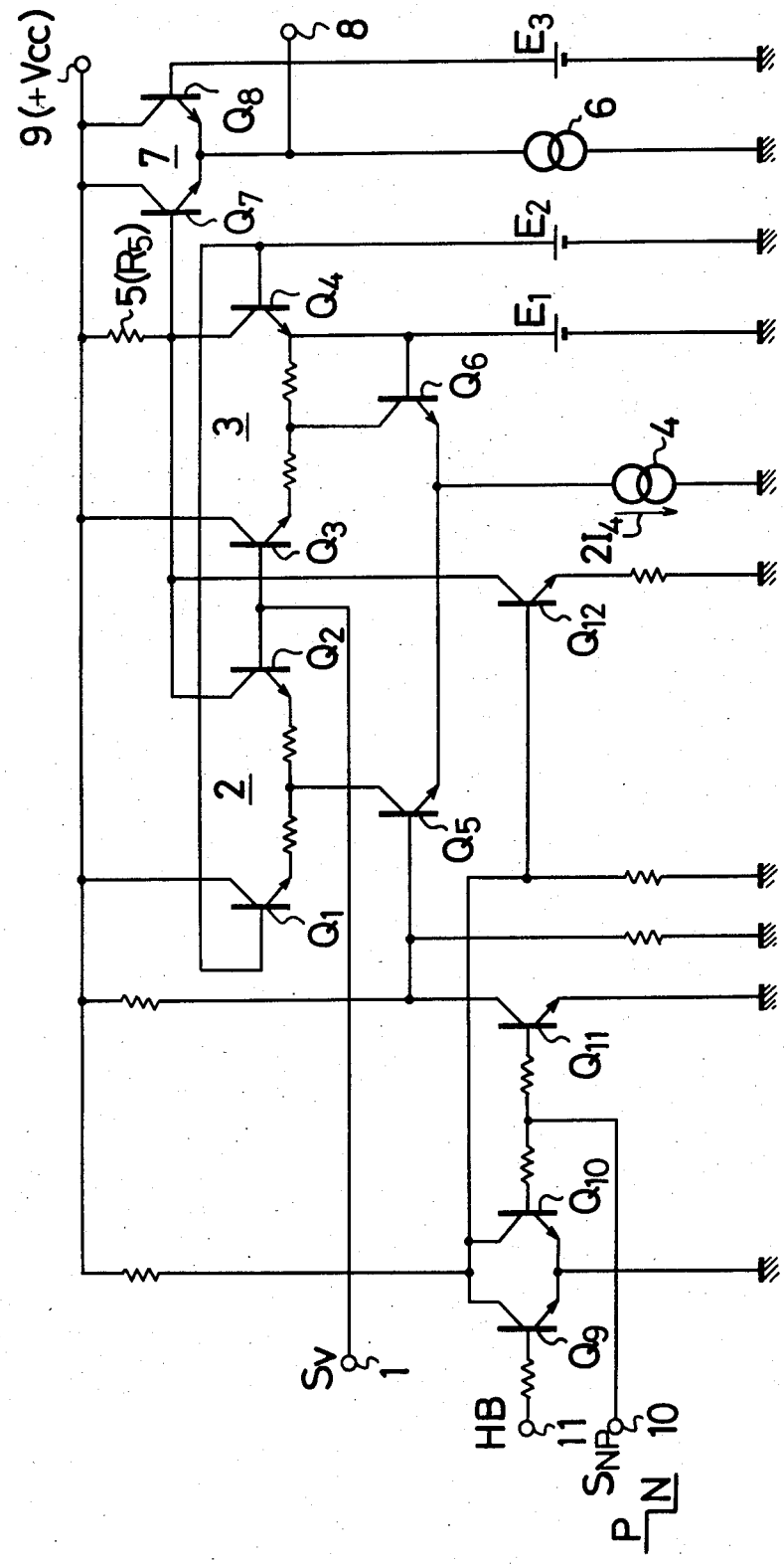
FIG. 1 is a circuit diagram showing an example of a conventional video signal inverting circuit.

In the posi-mode, similarly to the prior art example shown in FIG. 1, the horizontal synchronizing pulse HB which becomes low level during the horizontal blanking period $T_{HB}$ is supplied to the base of the transistor Q36 from a terminal 31. As a result, in the posi-mode, during the horizontal blanking period $T_{HB}$, instead of the transistor Q34 which differentially forms a pair together with the transistor Q33, the transistor Q35 the collector and emitter of which are respectively connected to those of the transistor Q34 is turned on, which does not affect the above switching operations.

In the nega-mode, since the switching signal $\overline{S_{NP}}$ becomes high level which is higher than the voltage E5, the transistor Q31 is turned on, while the transistor Q32 is turned off. Therefore, the collector potential of the transistor Q32 becomes high level to turn on the pair of transistors Q29 and Q30. Accordingly, an output video signal having a polarity opposite to that of the incoming video signal $S_V$ is obtained at the output terminal 28.

Figure 6A:
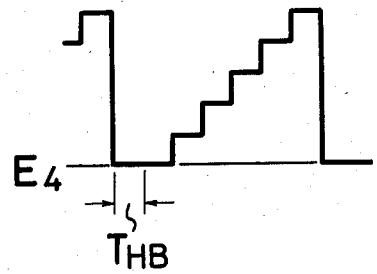
Figure 6B:
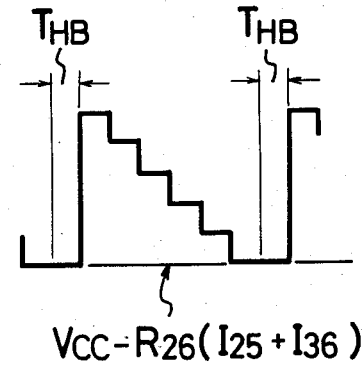

In this nega-mode, except during the horizontal blanking period $T_{HB}$, the transistor Q33 is turned on and the transistor Q34 is turned off so that the potential at the base of the transistor Q37 becomes lower than the potentials at the bases of the transistors Q38 and Q39, thus the pair of transistors Q45 and Q46 are turned off. Meanwhile, since the transistor Q34 is turned off, its collector potential becomes high level to select the pair of transistors Q38 and Q39, the bases of which are connected together. At this time, the switching signal $\overline{S_{NP}}$ is supplied through the input terminal 30 to the base of the transistor Q40. In the nega-mode, although the signal $\overline{S_{NP}}$ is high level, the level of the signal $\overline{S_{NP}}$ is selected in such a manner that a potential difference between the potential at the base of the transistor Q40 and the base potential E6 of the transistor Q42, which forms the differential pair with the transistor Q40, becomes equal to the pedestal level of the output signal which is developed at the output terminal 28 in the nega-mode. Since the collector outputs of the transistors Q40 and Q42 are respectively supplied to the bases of the pair of transistors Q43 and Q44 which are connected differentially to each other, the collector current of the transistor Q44 is reduced by the amount corresponding to the difference therebetween than the collector current of the transistor Q43 to raise the collector potential of the transistor Q44. Thus, the output video signal developed at the output terminal 28 whose polarity is inverted relative to that of the incoming video signal shown in FIG. 6A is made to have the pedestal level which is expressed by $$V_{CC} - R_{26}(I_{25} + I_{36})$$

as shown in FIG. 6B. Namely, the pedestal level of the above output video signal is made equal to that of the output video signal developed at the output terminal 28 in the posi-mode.

On the other hand, during the horizontal blanking period $T_{HB}$, the base potential of the transistor Q36 to which the horizontal synchronizing pulse HB is supplied becomes low level and hence the transistor Q36 is turned off so that the transistor Q35 is turned on, while the transistor Q33 is turned off. Therefore, during the horizontal blanking period $T_{HB}$, the pair of transistors Q45 and Q46 are selected similarly to the posi-mode. When the pair of the transistors Q43 and Q44 are not operated, the 100% white level of the inverted video signal becomes equal to the potential expressed by $V_{CC}-R_{26}(I_{25}+I_{36})$. Also, during the horizontal blanking period $T_{HB}$, when the incoming video signal is inverted, the 100% white level is presented. Thus, the pedestal level in the horizontal blanking period $T_{HB}$ becomes $V_{CC}-R_{26}(I_{25}+I_{36})$ which then coincides with the pedestal level of the output video signal in the nega-mode.

As a result, the pedestal level of the output video signal developed at the output terminal 28 in the nega-mode becomes coincident with that of the output video signal in the posi-mode. Therefore, regardless of modes, the pedestal level of the output video signal is fixed.

In consequence, according to the present invention, unlike the prior art, it is not necessary to provide at the rear stage of the video signal inverting circuit the clamp circuit by which the pedestal levels of the video signals in nega-mode and posi-mode are made coincident with each other. Moreover, even when the pedestal level is clamped to the predetermined level, unlike the prior art, a problem of follow-up in the clamp circuit is never arises upon selecting the nega-mode and posi-mode. There is then an advantage that stable clamp operations can be carried out.

As set forth above, according to the present invention, the pedestal levels of the output video signals in nega-mode and posi-mode are coincident with each other so that unlike the prior art it is not necessary to provide the clamp circuit by which the pedestal levels of the output video signals in nega-mode and posi-mode are made coincident with each other.

Furthermore, when the pedestal level is clamped to the predetermined level, if the pedestal level is different in nega-mode and posi-mode, the problem of the follow-up property upon selecting the nega-mode and posi-mode becomes serious. However, the present invention is free from such problem.

The above description is given on a single preferred embodiment of the invention, but it will be apparent that many modifications and variations could be effected by one skilled in the art without departing from the spirits or scope of the novel concepts of the invention, so that the scope of the invention should be determined by the appended claims only.

We claim as our invention:

1. A video inverting and non-inverting circuit operable in response to a switching signal to provide respective posi-mode and nega-mode wherein the pedestal levels of output signals are equal in the posi-mode and nega-mode, comprising, an input terminal to which an input video signal is connected, a first pair of transistors (Q21, Q22) differentially connected and said input terminal connected to the base of one of said first pair of differential connected transistors, a second pair of differentially connected transistors (Q25, Q26) with the bases of each connected to one of said first pair of differential transistors (Q21, Q22), a third pair of differentially connected transistors (Q27, Q28) connected to said second pair of differentially connected transistors (Q25, Q26), an output terminal connected to one (Q27) of said third pair of differentially connected transistors to receive the video signal in the posi-mode, a fourth pair of differentially connected transistors (Q29, Q30) connected to said second pair of differentially connected transistors (25, Q26), said output terminal connected to one (Q30) of said fourth pair of differentially connected transistors (Q29, Q30) to receive the video signal in the nega-mode, a switching terminal to which a switching signal is supplied, a fifth pair of differentially connected transistors (Q31, Q32) with one transistor (Q31) connected to said switching terminal such that said one transistor (Q31) is off during the posi-mode and on during the nega-mode and the other transistor (Q32) is on during the posi-mode and off during the nega-mode and said one transistor (Q31) connected to said third pair of differential transistors (Q27, Q28), a sixth pair of transistors (Q33, Q34) coupled to said switching terminal and to said other of said fifth pair of transistors (Q32) and to a source of horizontal blanking signal, a seventh pair of differentially connected transistors (Q45, Q46) coupled to one (Q33) of said sixth pair of transistors (Q33, Q34) and to said output terminal and conductive in the posi-mode and are non-conductive during the negi-mode, an eighth pair of differentially connected transistors (Q43, Q44) coupled to the other (Q34) of said sixth pair of transistors (Q33,Q34) and to said output terminal, and a reference voltage coupled to said eight pair of transistors.

2. A video inverting and non-inverting circuit according to claim 1 including a ninth pair of transistors (Q36, Q35) connected between said source of horizontal blanking signal and the other (Q34) of said sixth pair of differentially connected transistors (Q33, Q34).

3. A video inverting and non-inverting circuit according to claim 1 including a ninth pair of differentially connected transistors (Q40, Q41) connected to said eighth pair of differentially connected transistors (Q43, Q44).

* * * * *